US 6,434,665 B1

(12) United States Patent
Shepherd et al.

(10) Patent No.: US 6,434,665 B1
(45) Date of Patent: Aug. 13, 2002

(54) CACHE MEMORY STORE BUFFER

(75) Inventors: David Shepherd, Bristol (GB); Rajesh Chopra, Sunnyvale, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/410,678

(22) Filed: Oct. 1, 1999

(51) Int. Cl.⁷ .............................................. G06F 11/00

(52) U.S. Cl. ...................... 711/118; 711/141; 711/154

(58) Field of Search ............................ 711/118, 3, 141, 711/154

(56) References Cited

U.S. PATENT DOCUMENTS

| | | | |
|---|---|---|---|
| 3,820,078 A | * 6/1974 | Curley et al. ............ 340/172.5 |
| 4,814,981 A | 3/1989 | Rubinfield .................. 364/200 |
| 5,251,311 A | 10/1993 | Kasai ......................... 395/425 |
| 5,386,565 A | 1/1995 | Tanaka et al. ............. 395/700 |
| 5,423,050 A | 6/1995 | Taylor et al. .............. 395/575 |
| 5,434,804 A | 7/1995 | Bock et al. ................. 364/579 |
| 5,440,705 A | 8/1995 | Wang et al. ............. 395/421.1 |
| 5,448,576 A | 9/1995 | Russell ...................... 371/22.3 |
| 5,452,432 A | 9/1995 | Macachor ................... 395/425 |
| 5,455,936 A | 10/1995 | Maemura ............... 395/183.11 |
| 5,479,652 A | 12/1995 | Dreyer et al. .......... 395/183.06 |
| 5,483,518 A | 1/1996 | Whetsel ........................ 370/13 |
| 5,488,688 A | 1/1996 | Gonzales et al. ......... 395/183.1 |
| 5,530,965 A | 6/1996 | Kawasaki et al. .......... 395/800 |
| 5,570,375 A | 10/1996 | Tsai et al. .................. 371/22.3 |
| 5,590,354 A | 12/1996 | Klapproth et al. .......... 395/800 |
| 5,596,734 A | 1/1997 | Ferra .......................... 395/825 |
| 5,598,551 A | 1/1997 | Barajas et al. .............. 395/484 |
| 5,606,670 A | * 2/1997 | Abramson et al. .......... 395/250 |
| 5,608,881 A | 3/1997 | Masamura et al. ......... 395/306 |
| 5,613,153 A | 3/1997 | Arimilli et al. ............. 395/821 |
| 5,617,347 A | * 4/1997 | Lauritzen ..................... 365/49 |
| 5,627,842 A | 5/1997 | Brown et al. ............... 371/22.3 |
| 5,657,273 A | 8/1997 | Ayukawa et al. ....... 365/189.01 |
| 5,682,545 A | 10/1997 | Kawasaki et al. .......... 395/800 |
| 5,704,034 A | 12/1997 | Circello ................. 395/183.14 |
| 5,708,773 A | 1/1998 | Jeppesen, III et al. .. 395/183.06 |
| 5,717,896 A | * 2/1998 | Yung et al. .................. 395/467 |
| 5,724,549 A | 3/1998 | Selgas et al. ............... 395/468 |
| 5,737,516 A | 4/1998 | Circello et al. ........ 395/183.14 |
| 5,751,621 A | 5/1998 | Arakawa ................ 364/748.07 |
| 5,768,152 A | 6/1998 | Battaline et al. ....... 364/551.01 |

(List continued on next page.)

FOREIGN PATENT DOCUMENTS

| | | | |
|---|---|---|---|
| EP | 0165600 B1 | 11/1991 | ............ G06F/13/36 |
| EP | 063976 A1 | 2/1995 | ............ G06F/11/00 |
| EP | 0652516 A1 | 5/1995 | ............ G06F/11/00 |
| EP | 0702239 A2 | 3/1996 | ........ G01R/31/3173 |
| EP | 0720092 A1 | 7/1996 | ............ G06F/11/00 |
| EP | 0933926 A1 | 8/1999 | ............ H04N/5/00 |
| EP | 0959411 A1 | 11/1999 | ............ G06F/13/24 |
| JP | 8320796 A | 12/1996 | .............. G06F/9/46 |
| JP | 8329687 | 12/1996 | ............ G11C/15/00 |
| JP | 9212358 A | 8/1997 | .............. G06F/9/38 |
| JP | 9311786 A | 12/1997 | .............. G06F/9/38 |
| JP | 10106269 A | 4/1998 | ......... G11C/11/413 |
| JP | 10124484 A | 5/1998 | ............ G06F/17/10 |
| JP | 10177520 A | 6/1998 | ............ G06F/12/10 |
| WO | PCT/JP96/02819 | 9/1976 | .............. G06F/9/46 |
| WO | WO98/13759 | 4/1998 | .............. G06F/9/46 |

*Primary Examiner*—Matthew M. Kim
*Assistant Examiner*—Stephen Elmore
(74) *Attorney, Agent, or Firm*—Lisa K. Jorgenson; William J. Kubida

(57) ABSTRACT

Methods and an apparatus for storing information in a processing device with flexible security are disclosed. In one embodiment, an apparatus processes back-to-back write and read operations without stalling the processor. A cache memory subsystem buffers write operations between a central processing unit (CPU) and the cache memory subsystem. Included in the cache memory subsystem are a tag memory, a data memory and a store buffer. The store buffer is coupled to both the data memory and the tag memory. Additionally, the store buffer stores a write operation.

27 Claims, 6 Drawing Sheets

U.S. PATENT DOCUMENTS

| | | | |
|---|---|---|---|
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,845,321 A * | 12/1998 | Ito et al. | 711/118 |
| 5,848,247 A | 12/1998 | Matsui et al. | 395/284 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,918,045 A | 6/1999 | Nishii et al. | 395/584 |
| 5,920,889 A * | 7/1999 | Petrick et al. | 711/143 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,970,509 A * | 10/1999 | Green | 711/128 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,023,757 A | 2/2000 | Nishimoto et al. | 712/209 |
| 6,038,582 A | 3/2000 | Arakawa et al. | 708/501 |
| 6,038,661 A | 3/2000 | Yoshioka et al. | 712/244 |
| 6,070,234 A | 5/2000 | Shimazaki et al. | 711/167 |
| 6,145,054 A * | 11/2000 | Mehrotra et al. | 711/119 |
| 6,148,372 A * | 11/2000 | Mehrotra et al. | 711/122 |
| 6,154,812 A * | 11/2000 | Hetherington et al. | 711/122 |
| 6,226,713 B1 * | 5/2001 | Mehrotra | 711/118 |

\* cited by examiner

CACHE MEMORY STORE BUFFER

BACKGROUND OF THE INVENTION

This invention relates in general to memory caching systems and, more specifically, to an apparatus and methods for allowing buffering of commands for a cache memory.

Processors are clocked at ever increasing frequencies to increase performance of the systems in which they are embedded. Today, these frequencies are approaching one gigahertz. Although the clock frequency of the processors is increasing, some memory has not kept pace with this evolution.

There are two major categories of memory, namely, static random access memory (SRAM) and dynamic random access memory (DRAM). SRAM can operate at speeds approaching one gigahertz, but DRAM only operates at speeds approaching two hundred megahertz. With this in mind, designers could use SRAM in order to have memory operate at the same clock frequency as the processor, however SRAM is much more costly than DRAM. This cost differential is attributable to the fact that a SRAM memory cell takes about eight transistors to implement, while a DRAM memory cell only takes one. Accordingly, most processing systems have far more DRAM than SRAM.

To achieve speeds with DRAM which approach SRAM speeds, memory cache circuits are used. Memory caches use a small SRAM which is mapped to a larger DRAM typically, outside the processor. Memory caches work under the principal that most read or write operations are fulfilled by the cache and do not require a time intensive read from external memory. Even for moderately sized memory caches, hit rates are near ninety-nine percent.

Although most processors have an on chip cache, there is further need for improving cache architectures. One common problem in cache architectures is where a write operation is immediately followed by a read operation. The write operation to a data memory in the cache is subdivided into two parts: checking a tag memory for a hit and writing to the data memory when there is a hit. The read operation from data memory is also subdivided into two parts: checking tag memory for a hit and reading the appropriate set from the data memory when there is a hit. To speed execution of the read operation, both parts are executed simultaneously and once a hit is determined, the proper data is selected from the set which has been already read. In this way, the read operation can execute in one clock cycle while the write operation takes two clock cycles to execute its two parts.

In conventional cache architectures, only a single access of data memory is possible at the same time. When the write operation is immediately followed by a read operation, the write to the data memory in the second clock cycle clashes with the read from data memory of the subsequent read operation. In Table I, this clash occurs in cycle n+1 and is characterized by both write and read operations attempting to access the data memory at the same time which is not possible. To avoid this problem some conventional processors stall execution so that the write operation can complete before starting the read operation, as shown in Table II. Those skilled in the art appreciate that stalling the processor reduces performance of the system because the two pipelined operations require three cycle to complete.

TABLE I

| | Cycle | |
|---|---|---|
| Operation | n | n + 1 |
| Write | Check Tag | Write Data |
| Read | | Check Tag & Read Data |

TABLE II

| | Cycle | | |
|---|---|---|---|
| Operation | n | n + 1 | n + 2 |
| Write | Check Tag | Write Data | |
| Stall | — | — | |
| Read | | | Check Tag & Read Data |

Some have solved the back-to-back write-before-read problem by increasing the speed of the cache. If the cache runs at a frequency twice as fast as the frequency of the processor, the write operation can be completed in a single clock cycle of the processor. This technique is effective, but it requires the cache to run at twice the frequency of the processor. However, as processor clock frequencies approach one gigahertz, conventional techniques cannot run the cache at twice that frequency. Accordingly, new techniques are needed to solve the back-to-back write-before-read problem.

SUMMARY OF THE INVENTION

According to the invention, disclosed are an apparatus and methods which allow for processing back-to-back write and read operations without stalling the processor. In one embodiment, a cache memory subsystem buffers write operations between a central processing unit (CPU) and the cache memory subsystem. Included in the cache memory subsystem are a tag memory, a data memory and a store buffer. The store buffer is coupled to both the data memory and the tag memory. Additionally, the store buffer stores a write operation.

In another embodiment, a process for storing information in a memory cache is disclosed. The process includes receiving a write operation and queuing the write operation while other operations are performed. At a later time, the write operation is executed. The write operation may be queued in a store buffer, for example.

In yet another embodiment, a process for performing back-to-back cache operations is disclosed. In one step, a write operation is received and queued. A read operation is received and executed in other steps. After queuing, the write operation is executed.

DESCRIPTION OF THE SPECIFIC EMBODIMENTS

In order to avoid stalling the processor between back-to-back write and read operations, the present invention includes a store buffer. When a read operation is detected immediately after a write operation, the write operation is queued in the store buffer until a later time. After all read operations are completed, the queued write operation is removed from the store buffer and executed. In this way, stalling of the processor is avoided when back-to-back write and read operations are issued.

In the Figures, similar components and/or features may have the same reference label. Additionally, various components of the same type may be distinguished by following the reference label by a dash and a second label that distinguishes among the similar components. If only the first reference label is used, the description is applicable to any one of the several similar components with that same first reference label.

Figure 1:
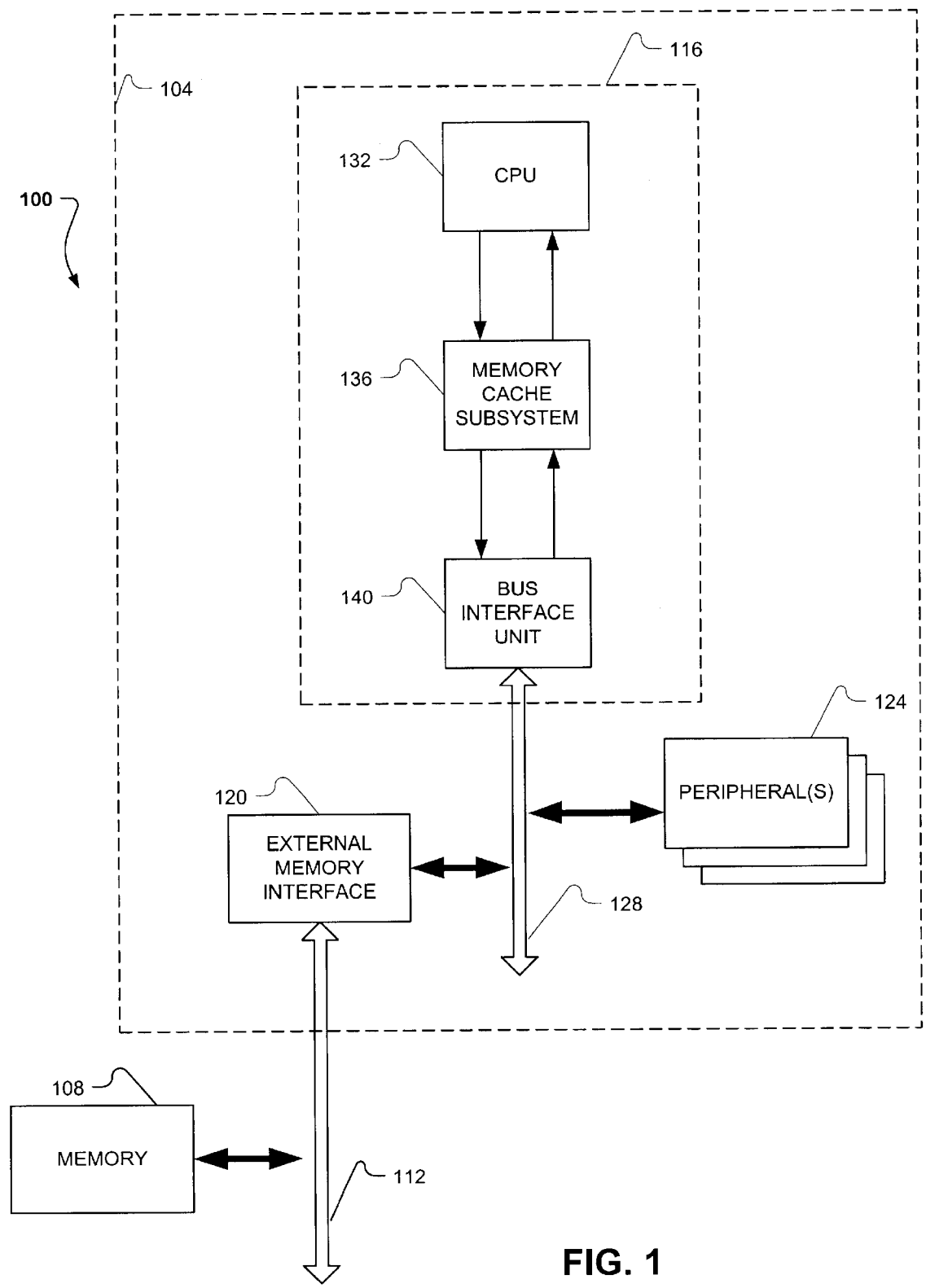
FIG. 1 is a block diagram which depicts one embodiment of a computer architecture incorporating a store buffer in a memory cache subsystem.

With reference to FIG. 1, an embodiment of a processing system 100 which incorporates a store buffer is shown in block diagram form. Included in the system 100 are a processing chip 104 which communicates with external memory 108 by way of an off-chip bus 112. The processing chip 104 has a central processing unit (CPU) core 116 which communicates by way of an on-chip bus 128 to an external memory interface 120 and peripherals 124. Within the CPU core 116 are a CPU 132, a memory cache subsystem 136 and a bus interface unit 140.

In this embodiment, the external memory 108 is SDRAM and has much larger capacity than SRAM in the memory cache subsystem 136. The SDRAM operates at a one hundred megahertz frequency while the SRAM and CPU 132 operate at a four hundred megahertz frequency. Data access of the cache takes one CPU clock cycle, but data access of the external memory 108 takes at least four CPU clock cycles.

An access to external memory 108 from the memory cache subsystem 136 takes several steps. The bus interface unit 140 interfaces between the cache subsystem 136 and the on-chip bus 128. The on-chip bus 128 operates at two hundred megahertz, but the CPU core 116 operates at four hundred megahertz. Bridging data between these two frequencies is the bus interface unit 140. The external memory interface 120 interfaces the on-chip bus 128 with the off-chip bus 112. Since these two buses 112, 128 operate at different frequencies, the external memory interface converts between these frequencies.

A number of peripherals 124 are coupled to the on-chip bus 128. These peripherals 124 perform various functions for the processing system 100 such as a serial interface, watchdog timer or direct memory interface. The peripherals 124 are mapped to the CPU 132 address space through a series of input/output ports. In some cases, the peripherals 124 can master the buses 112, 128 and access the address space without passing through the CPU 132 by a process called snooping. The cache subsystem 136 is notified when a snoop is requested so that any dirty cached memory, which is subject to the snoop, can be drained in order to preserve memory coherency.

A load/store unit (LSU) in the CPU 132 issues read operations and write operations as they are encountered during code execution. All read and write operations are sent from the CPU 132 to the memory cache subsystem 136 for possible fulfillment. However, address ranges designated as non-cacheable are passed through the cache subsystem 136 to external memory for fulfillment.

Not every instruction requires the services of the LSU. Instructions without read or write operations are called free cycles because the cache is not required to begin another operation during this cycle. As will become clear below, free cycle are used to unload write operations queued in the store buffer.

The cache subsystem 136 includes a cache memory and a store buffer. Preferably, the cache is a 4-way set-associative cache which supports both write-back and write-through write operations. Address ranges can be designated as write-back or write-through by software. However, other embodiments could configure the cache differently. The cache stores thirty-two kilobytes of data divided among the four sets.

Figure 2:
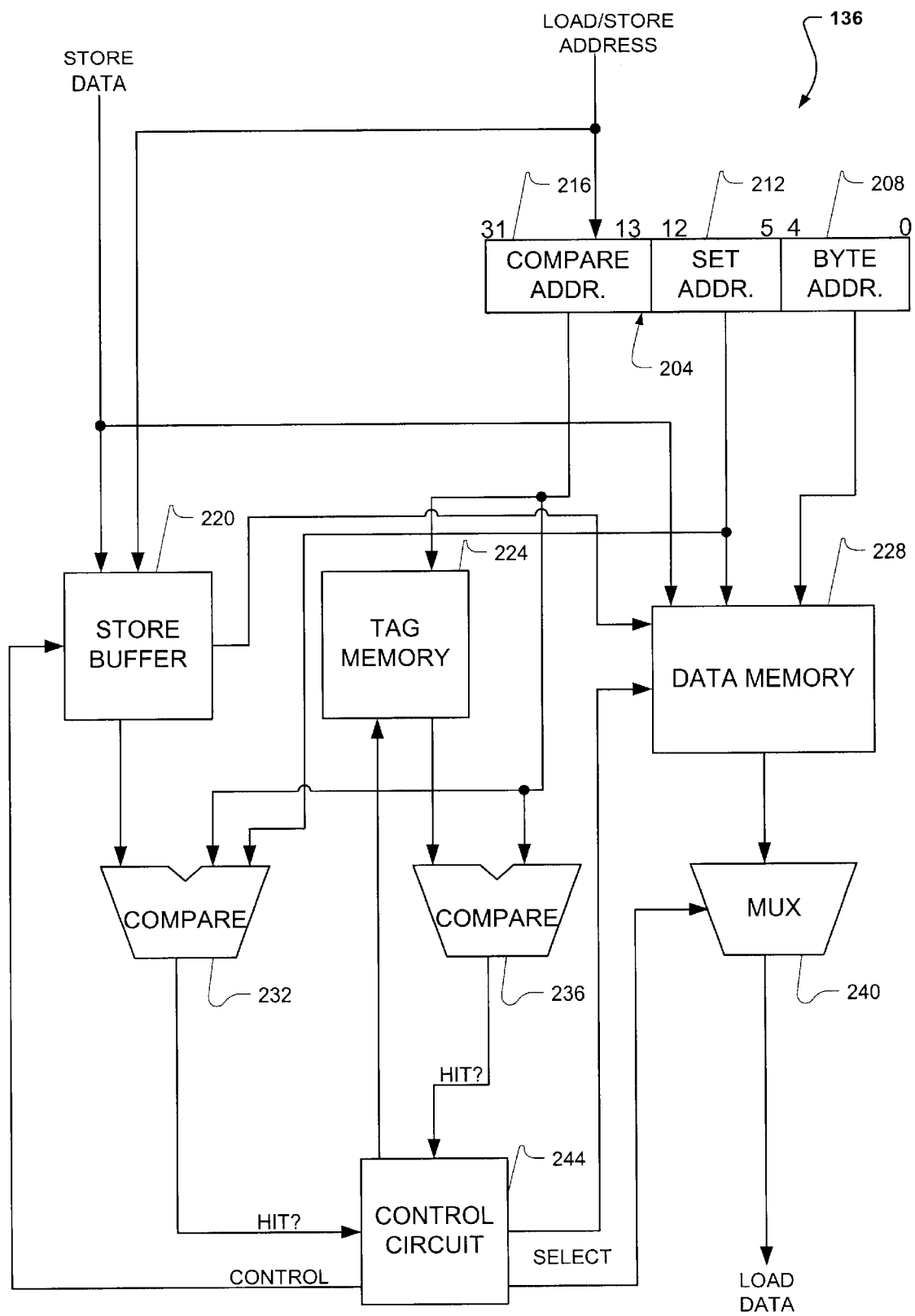
FIG. 2 is a block diagram illustrating an embodiment of a memory cache subsystem which uses a store buffer.

Referring next to FIG. 2, an embodiment of the memory cache subsystem 136 is shown in block diagram form. The cache subsystem 136 includes a store buffer 220, tag memory 224, data memory 228, a first compare circuit 232, a second compare circuit 236, a multiplexer 240, and a control circuit 244. The cache subsystem 136 performs the functions of a cache memory while supporting out-of-order execution of write operations when immediately followed by a read operation. The store buffer 220 allows this out-of-order execution of write operations while the control circuit 224 maintains memory coherency.

The cache subsystem 136 receives the input to and output from the LSU and interfaces with external memory 108. The cached write data are eventually stored to external memory 108 and potential read data are loaded from external memory 108. The connections between the CPU 132 and cache subsystem 136 are shown in FIG. 2, but the connections to the bus interface unit 140 and ultimately, external memory 108 are not shown in order to simplify the block diagram. The missing interfaces to external memory 108 are well know to those skilled in the art.

Each write operation includes store data and a store address as well as certain status bits, and each read operation includes load data and a load address. In block 204 the load or store address is broken out to illustrate its constituent parts. The address 204 is thirty-two bits wide and includes a five bit byte address 208, an eight bit set address 212, and a nineteen bit compare address 216. Data stored in the data memory 228 is arranged in blocks which have thirty-two bytes each. The byte address 208 specifies which byte in the block to address. Each set has two hundred and fifty six blocks and the set address 212 specifies which block, in the set to address. The compare address 216 is used to determine if there is a hit in tag memory 224 or the store buffer 220.

The tag memory or tag array 224 stores the addresses which correspond to data stored in the data memory 228. When checking the tag memory 224 for a hit, all addresses which could correspond to the write or read operation are output to a second compare circuit 236. The second compare circuit 236 performs this comparison and notifies the control circuit 244 if there is a hit. In the case of a read operation, the data is already output from the data memory 228 and the control circuit 244 selects the appropriate output from the multiplexer 240. In the case of a write operation, the store data is usually written to the data memory 228 in the next CPU cycle, unless the write operation is immediately followed by a read operation.

The data memory 228 stores the cached data associated with one set. Although not shown in FIG. 2, there can be a number of data memories which each hold a different set of data. By knowing the set, the proper data memory 228 is selected. Preferably, each data memory 228 stores eight kilobytes of data, and since this is a four way set associative cache, there are four data memories 228. The data memory 228 is written by either the LSU or the store buffer 220 according to a process explained below. The combination of the set address 212 and byte address 208 can address all the bytes stored in the data memory 228.

The control circuit 244 manages operation within the memory cache subsystem 136. When a read operation is executed, the control circuit 244 waits for a hit and selects the proper block from the multiplexer 240 to return to the LSU. The control circuit 244 detects when a read operation immediately follows a write operation and queues the write operation in the store buffer 220. When a free cycle (i.e., a cycle without a command from the LSU) is detected or when the store buffer 220 becomes full and another write operation is received, the control circuit 244 removes a queued write operation from the store buffer 220 and writes it to data memory 228.

The control circuit 244 also monitors cache coherency. When there is a valid entry in the store buffer 220 and there is a match between the address of that entry and a subsequent read operation, the entry in the store buffer 220 is drained by the control circuit 244. When a write-back from the cache to external memory 108 takes place, any entries in the store buffer 220 which match the data to be written back are also drained. In other embodiments, this process could be simplified by draining the whole store buffer whenever there is a write-back operation. Write-back operations can occur when a snoop hit is detected or a dirty entry is evicted after a cache miss. The addresses of entries in the store buffer 220 are compared by the first compare circuit 232 to determine if draining of the buffer 220 is needed to maintain memory coherency.

The store buffer 220 queues write operations which are immediately followed by read operations. This queuing allows for out-of-order execution of commands from the LSU. In other words, a write operation may be executed after a subsequent read command under certain circumstances.

bits 324 indicate the way data is written to the memory cache for multiple-way set-associative caches.

With reference to Table III, out-of-order execution is illustrated for an operation sequence which includes a read operation immediately following a write operation. Each of the read operation and write operation are pipelined to execute in a series of cycles. In the first cycle (n), the tag memory 224 is checked for a hit to determine if the address of the write operation is currently cached. In the second cycle (n+1), a read operation is received so the write operation is queued in the store buffer 220. The read operation can check the tag memory 224 and store buffer 220, select the correct block, and read out the data in the same clock cycle (n+1). Since the third operation does not involve the LSU, this free cycle allows draining of the previously stored entry 320 from the store buffer 220.

TABLE III

| Operation | Cycle | | |
|---|---|---|---|
| | n | n + 1 | n + 2 |
| Write | Check Tag | Que in Buffer | Write Data Cache |
| Read | | Check Tag & Read Data | |
| Free Cycle | | | |

Referring next to Table IV, an operation sequence, which includes a write operation immediately followed by three read operations, is shown. In the first CPU cycle (n), tag memory 224 is checked for the address of the write operation, whereafter the write operation is queued in the store buffer 220 in the second cycle (n+1). Also in the second cycle (n+1), the first read operation is executed. In the third and fourth cycles (n+2, n+3) the write operation remains queued while the second and third read operations are executed. In the fifth cycle (n+4), the LSU does not issue a command and the write operation completes by writing data to the data memory 228.

TABLE IV

| Operation | Cycle | | | | |
|---|---|---|---|---|---|
| | n | n + 1 | n + 2 | n + 3 | n + 4 |
| Write | Check Tag | Que in Buffer | Que in Buffer | Que in Buffer | Write Data |
| Read | | Check Tag & Read Data | | | |
| Read | | | Check Tag & Read Data | | |
| Read | | | | Check Tag & Read Data | |
| Free Cycle | | | | | |

Figure 3:
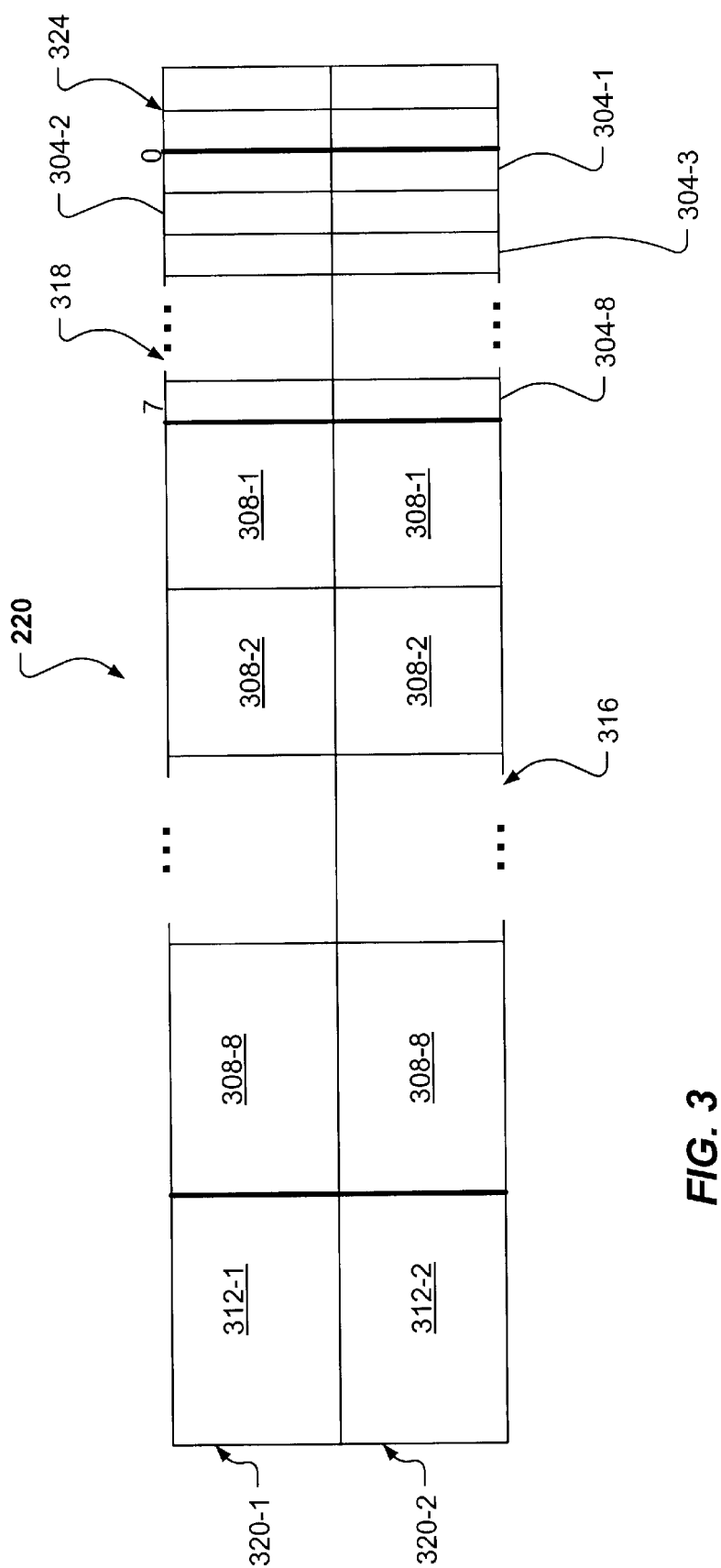
FIG. 3 is a block diagram of the store buffer which shows a number of entries.

Referring next to FIG. 3, an embodiment of the store buffer 220 is shown which holds a variety of information. There are two entries 320-1, 320-2 in the store buffer 220 where each entry 320-1, 320-2 corresponds to a queued write operation. Each entry 320-1, 320-2 includes a store address 312-1, 312-2, a data word 316, a mask byte 318, and way information bits 324. The data word 316 includes up to eight data bytes 308-1 to 308-8. The mask byte 318 includes bits 304-1 to 304-8 which indicate the bytes 308-1 to 308-8 in the block 316 are valid. In this way, partial words 316 are written to the cache subsystem 136. The way information With reference to Table V, an operation sequence is shown which includes two write operations followed by two read operations and a free cycle. The write operation in this embodiment has a data alignment step between the tag check and write data steps. Data alignment uses the lower three bits of the address in order to arrange the bytes 308 for partial word stores where the words are sixty-four bits wide. However, embodiments with different word sizes would use a different number of bits when performing alignment. Alignment takes one CPU cycle.

The first write operation begins in the first cycle (n) and continues to the alignment phase in the second cycle (n+1).

The second write operation begins in the second cycle (n+1) with a tag check and proceeds to alignment in a third cycle (n+2). Since a first read operation is executed in the third cycle (n+2), the first write operation is queued in the store buffer 220. A second read operation in the fourth cycle (n+5) results in queuing the second write operation also. In a fifth cycle (n+4) which is free of LSU commands, the oldest write operation in the store buffer 220 is completed. Finally, the second write operation is also removed from the store buffer in a sixth cycle (n+5). In this embodiment, number of entries 320 in the store buffer 220 is equal to the additional pipeline stages before the write data step. For example, this embodiment has two entries 320 in the store buffer 220 for the tag check and alignment steps.

In the next stage of the write operation pipeline (i.e., in step 408), a determination is made whether a read operation was issued from the LSU in this CPU cycle.

If there is no read operation immediately following the write operation, the write operation continues processing in step 424. A further determination is made in step 424 as to whether the store buffer 220 is empty. If the next operation is not a read and the store buffer 220 is empty, processing continues upon the write operation in step 420. This processing includes writing data to the data memory 228 and setting a dirty bit in the data memory 228 to indicate the contents of the entry 320 have changed since retrieving it from external memory 108.

Alternatively, processing continues to steps 428 and 432 if in steps 408 and 424 it is determined the next operation is

TABLE V

| | Cycle | | | | | |
|---|---|---|---|---|---|---|
| Operation | n | n + 1 | n + 2 | n + 3 | n + 4 | n + 5 |
| Write | Check Tag | Align | Que in Buffer | Que in Buffer | Write Data | |
| Write | | Check Tag | Align | Que in Buffer | Que in Buffer | Write Data |
| Read | | | Check Tag & Read Data | | | |
| Read | | | | Check Tag & Read Data | | |
| Free Cycle | | | | | | |
| Free Cycle | | | | | | |

Referring next to Table VI, an operation sequence is shown which involves a write operation followed by a read operation to the same address. Normally, out-of-order execution would lead to reading before writing which could lead to memory coherency problems. However, this embodiment detects the read operation is to the same address as a queued operation in the store buffer 220 and stalls the read operation to let the write operation complete. In the first cycle (n), the tag memory 224 is checked for a hit on the address of the incoming write operation. Detecting a read operation in the second cycle (n+1), the write operation is sent to the store buffer 220. To execute the read operation, the tag memory 224 and store buffer 220 are checked for a hit at the same time as reading out the data memory 228. In this example, the address for the read operation matches the address for the entry 320 in the store buffer 220. To maintain coherency, the read operation is stalled while the entry corresponding to the write operation is unloaded from the store buffer 220. The read operation is then executed after the store buffer 220 is unloaded. As those skilled in the art can appreciate, compilers can largely eliminate stalls in this situation by avoiding reading data just after it is stored.

not a read and the store buffer 220 is not empty. In step 428, the current write operation is queued. The store buffer 220 is then emptied in step 432 by starting with any previously stored write operations and ending with the current write operation. In other words, the oldest entry is always retired first.

If in step 408 it is determined the next operation is a read, processing continues to steps 412 and 416. In step 412, the write operation is queued in the store buffer 220. In the same CPU cycle, the read operation is processed in step 416. Processing of the read operation includes checking the store buffer 220 and tag memory 224 for a hit and selecting the proper data from the data memory 228 if there is a tag memory hit. Processing loops back to step 408 in order to see if another read operation follows after the first read operation. If there is no additional read operation, the queued write operation(s) are executed. Although not shown in FIG. 4, the queued write operation remains queued unit a free cycle occurs.

Figure 5:
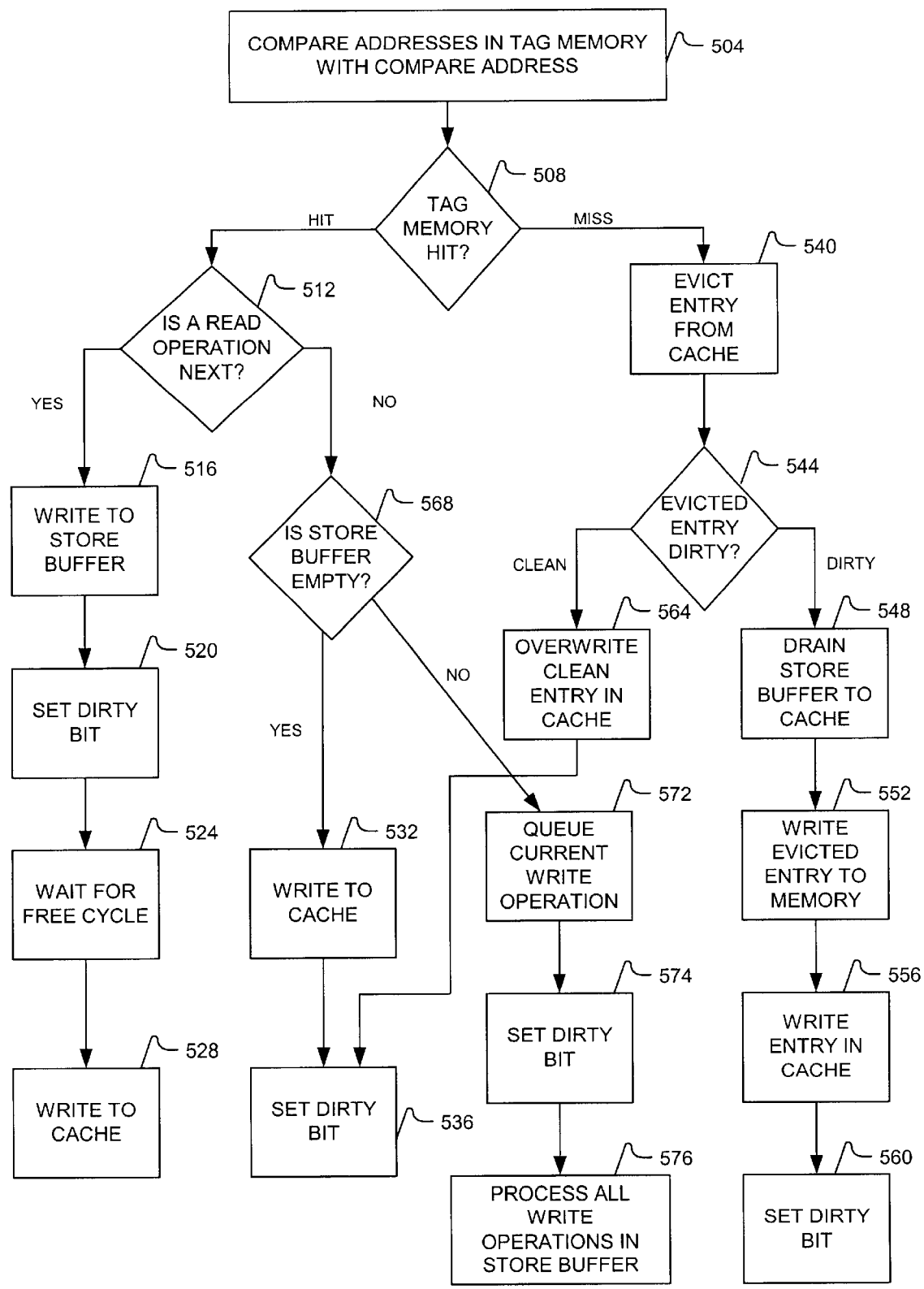
FIG. 5 is a flow diagram which shows one embodiment of a method for storing to the cache memory subsystem.

Referring next to FIG. 5, an embodiment of a process for storing information to the cache memory is shown in flow diagram form. The process begins in step 504 by checking

TABLE VI

| | Cycle | | | |
|---|---|---|---|---|
| Operation | n | n + 1 | n + 2 | n + 3 |
| Write | Check Tag | Que in Buffer | Write Data | |
| Read | | Check Tag & Read Data Cache | Stall | Check Tag & Read Data Cache |

Figure 4:
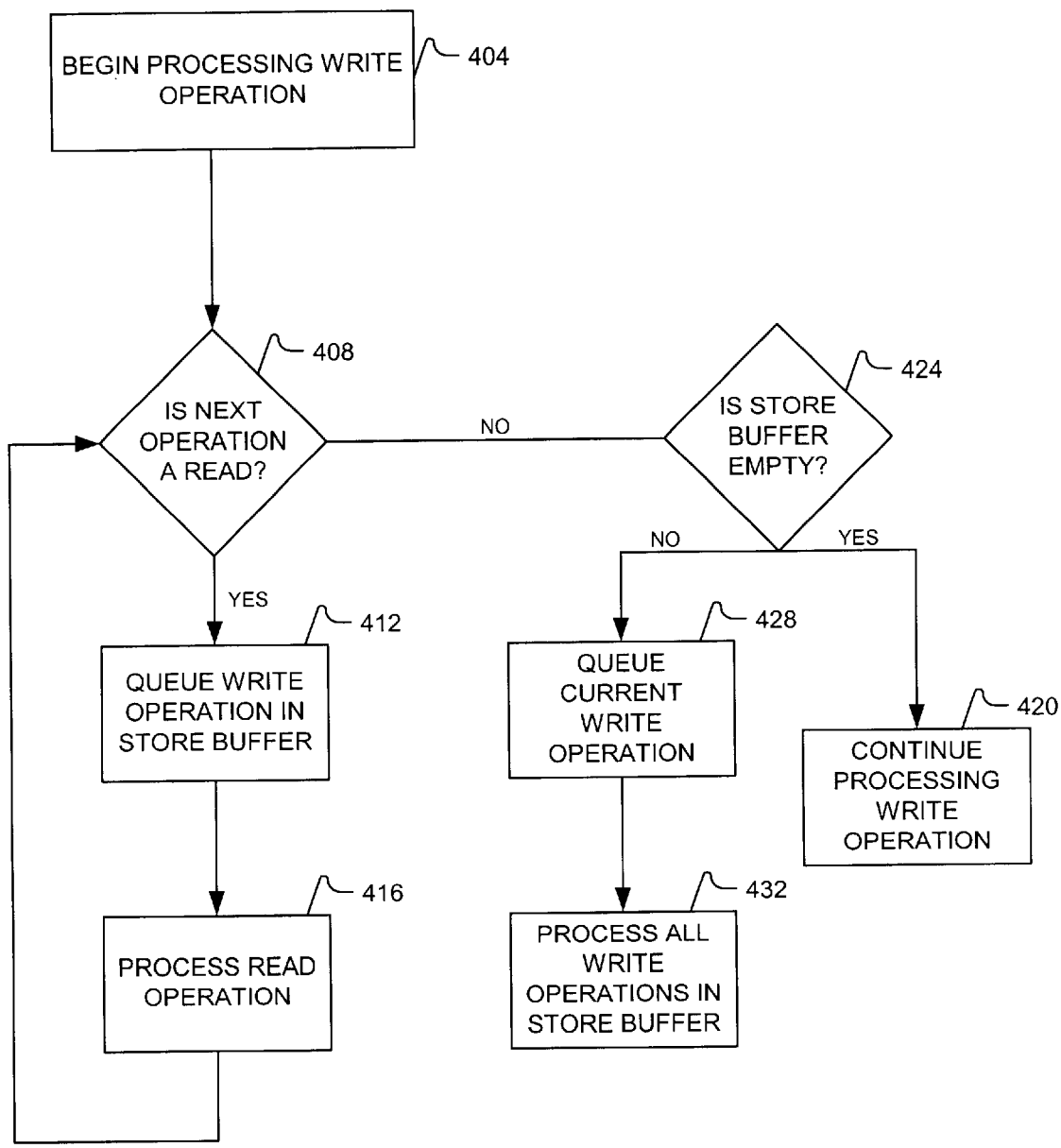
FIG. 4 is a flow diagram which illustrates one embodiment for performing a write operation and read operation back-to-back.

With reference to FIG. 4, an embodiment of a process for performing back-to-back write and read operations is illustrated in flow diagram form. The process begins in step 404 by starting the processing of the write operation. This processing includes checking the tag memory 224 for a hit.

for a hit in the tag memory 224 which involves comparing the addresses in the tag memory 224 with the compare address 216 of the incoming write operation. A determination is made in step 508 if there was a hit in the tag memory 224. Assuming there was a hit, a further determination is made in step 512 as to whether a read operation follows in the next CPU cycle.

If there is no read operation following the write operation, a further determination is made in step 568 as to whether the store buffer 220 is empty. If the store buffer is empty, data is written to the data memory 228 in step 532. In step 536, the dirty bit corresponding to that entry 320 in the cache is set. Alternatively, the current write operation is queued in the store buffer 220 in step 572 if it is determined in step 568 that there is a previous entry or entries 320. In step 574, the dirty bit is set for the queued write operation. Starting with the oldest entry 320 in the store buffer 220, the store buffer 220 is drained in step 576.

If there is a read operation following the write operation, as determined in step 512, the write operation is queued in the store buffer 220 in step 516. The dirty bit for the queued write operation is set in step 520. In step 524, the write operation waits in the store buffer 220 for the read operation and any subsequent read operations to complete. After the wait for a free cycle, the data from the write operation is written in step 528 to the data memory 228.

Going back to step 508, the scenario of a tag memory 224 miss is addressed. In step 540, the process of evicting a entry from the cache is begun. A determination is made in step 544 as to whether the entry being evicted is dirty. If the entry is clean, the data in the entry was not modified while in the cache. Unmodified entries are overwritten in step 564. To indicate the contents of the entry have changed since being read from external memory 108, a dirty bit for that entry is set in step 536.

If the entry being evicted is determined dirty in step 544, additional processing is required. In step 548, the store buffer 220 is drained of all its entries 320. Draining allows making any queued modifications to the entry before it is written to external memory 108. In step 552, the evicted entry is written to external memory 108. Once the entry is cleared from the cache, a new entry associated with the write entry is written in step 556. The dirty bit is set for the new entry in step 560.

Figure 6:
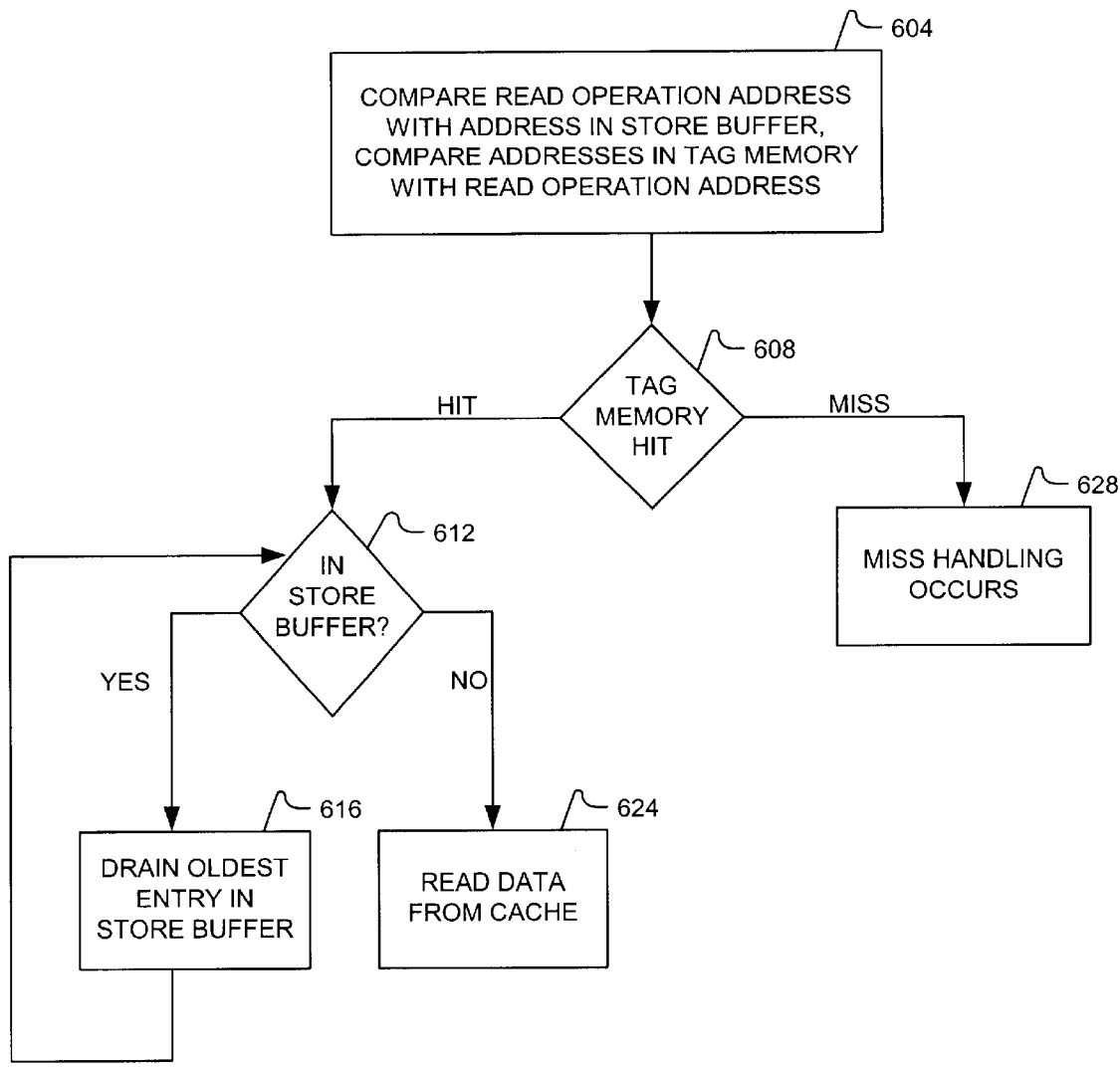
FIG. 6 is a flow diagram depicting an embodiment of a method for reading from the cache memory subsystem.

With reference to FIG. 6, an embodiment of a process for reading from the cache memory is shown as a flow diagram. Processing begins in step 604, where the addresses in the tag memory 224 and store buffer 220 are checked against a compare address 216 of the read operation to determine if there is a hit. If there is no hit in the cache, as determined in step 608, miss handling occurs in step 628. Miss handling includes reading from external memory 108.

If a tag memory hit is determined in step 608, a further determination is made in step 612 as to whether the store buffer 220 has an entry 320 with the same address as the read operation. If there is no hit (i.e., there is a miss) from the store buffer 220, the data is read from the data memory 228 in step 624. Alternatively, further processing is required if the store buffer 220 does contain an entry 320 which corresponds to the read operation, as determined in step 612. In step 616, the store buffer 220 is drained of the oldest entry 320 after a hit from the store buffer 220. After draining the oldest entry, processing loops back to step 612 to determine if there is still an entry which corresponds to the read operation. If the corresponding entry 320 is not drained, the oldest entries 320 are removed one at a time. After the matching entry is retired, the entries in the cache are coherent and processing continues to step 624.

In light of the above description, a number of advantages of the present invention are readily apparent. Processors can issue write operations and read operations back-to-back while reducing the risk of stalling while the write operation completes. In other words, the LSU can issue write and read operation which are processed by the cache out-of-order. Additionally, memory coherency is maintained even though memory operations are executed out-of-order.

A number of variations and modifications of the invention can also be used. For example, the cache could implement write-through or write-back architectures. Further, other configurations than 4-way set associative could be used. Further still, the memory being cached could be on-chip or off-chip and could be another level of caching.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A cache memory subsystem which buffers write operations between a central processing unit (CPU) and the cache memory subsystem, the cache memory subsystem comprising:

tag memory;

data memory;

a store buffer coupled to the data memory and the tag memory, wherein the store buffer stores a write operation; and a control circuit coupled to the store buffer, wherein the control circuit writes a first portion of the write operation in the data memory and writes a second portion of the write operation in the tag memory and wherein the control circuit is adapted to monitor receipt of a read operation comprising a read address, to compare the read address to a write address, and initiate emptying the store buffer in response to the comparing.

2. The cache memory subsystem as set forth in claim 1, wherein the store buffer stores a plurality of write operations.

3. The cache memory subsystem as set forth in claim 1, wherein the store buffer retains a write operation when it is immediately followed by a read operation and the read address and write address differ.

4. The cache memory subsystem as set forth in claim 1, wherein the tag memory is set-associative.

5. The cache memory subsystem as set forth in claim 1, wherein the store buffer comprises at least two of the following:

an address of a write operation;

data for a write operation; and way information for multiple-way set-association.

6. A method for storing information in a memory cache, the method comprising steps of:

receiving a write operation;

executing a first portion of the write operation;

queuing the write operation while other operations are performed;

executing a second portion of the write operation;

receiving a read operation comprising a first address, wherein the write operation comprises a second address;

comparing a first portion of the first address to a second portion of the second address while the write operation is queued in a store buffer; and emptying the store buffer in response to the comparing step.

7. The method as set forth in claim 6, further comprising a step of receiving a read operation, wherein the queuing step is responsive to the step of receiving a read operation.

8. The method as set forth in claim 6, further comprising a step of executing a read operation before the step of executing a second portion of the write operation when the write operation is received immediately before the read operation and the first and second addresses differ.

9. The method as set forth in claim 6, wherein the step of queuing comprises storing the write operation in a store buffer.

10. The method as set forth in claim 6, wherein the emptying step further comprises emptying the store buffer in response to the first address matching the second address in the comparing step.

11. The method as set forth in claim 6, wherein the emptying step includes steps of:

stalling the read operation until the emptying step completes when the first and second address are the same;

storing a plurality of data blocks in a data memory; and deleting a plurality of write operations from the store buffer.

12. A method for storing information in a memory cache, comprising:

receiving a write operation;

executing a first portion of the write operation;

queuing the write operation while other operations are performed; and executing a second portion of the write operation, wherein the step of executing a second portion is responsive to at least one of the following steps:

comparing a first address portion of the write operation with a second address portion of a read operation;

determining an absence of pending read operations and write operations;

receiving an additional write operation for the memory cache;

comparing the first address portion with a third address portion of an external memory read operation; and evicting of a dirty entry in the memory cache after a cache miss.

13. The method as set forth in claim 12, further comprising a step of receiving a read operation, wherein the queuing step is responsive to the step of receiving a read operation.

14. The method as set forth in claim 12, further comprising a step of executing a read operation before the step of executing a second portion of the write operation when the write operation is received immediately before the read operation and the read operation has a first address that differs from a second address of the write operation.

15. The method as set forth in claim 12, wherein the step of queuing comprises storing the write operation in a store buffer.

16. The method as set forth in claim 12, the method further comprising steps of:

receiving a read operation comprising a first address, wherein the write operation comprises a second address;

comparing a first portion of the first address to a second portion of the second address while the write operation is queued in a store buffer; and emptying the store buffer in response to the comparing step.

17. The method as set forth in claim 16, wherein the emptying step further comprises emptying the store buffer in response to the first address matching the second address in the comparing step.

18. The method as set forth in claim 16, wherein the emptying step includes steps of:

stalling the read operation until the emptying step completes when the read and write operations comprise the same address;

storing a plurality of data blocks in a data memory; and deleting a plurality of write operations from the store buffer.

19. A method for performing back-to-back cache operations, the method comprising steps of:

receiving a write operation including a second address portion;

executing a first portion of the write operation;

queuing the write operation;

receiving a read operation including a first address portion;

executing the read operation when the first and second address portions differ; and executing a second portion of the write operation, wherein the step of executing a second portion of the write operation comprises executing a second portion of the write operation when there are no pending read operations and write operations.

20. The method as set forth in claim 19, further comprising steps of:

comparing the first address portion of the read operation to the second address portion of the write operation while the write operation is queued in a store buffer; and emptying the store buffer in response to the comparing step.

21. The method as set forth in claim 20, wherein the emptying step further comprises emptying the store buffer in response to the first address portion matching the second address portion in the comparing step.

22. The method as set forth in claim 20, wherein the emptying step includes steps of:

storing a plurality of data blocks in a data memory; and deleting a plurality of write operations from the store buffer.

23. The method as set forth in claim 19, wherein the queuing step is responsive to the step of receiving a read operation.

24. The method as set forth in claim 19, wherein the queuing step comprises storing the write operation in a store buffer.

25. The method as set forth in claim 19, wherein the step of executing the read operation is performed before the step of executing the write operation.

26. The method as set forth in claim 19, wherein the step of executing a first portion of the write operation comprises a step of checking a tag memory for a hit.

27. The method as set forth in claim 19, wherein the step of executing a second portion of the write operation comprises a step of storing a data block in a data memory.

* * * * *